A. N. ADAMS.
TRANSMISSION GEARING.
APPLICATION FILED DEC. 26, 1911.
1,111,551.
Patented Sept. 22, 1914.
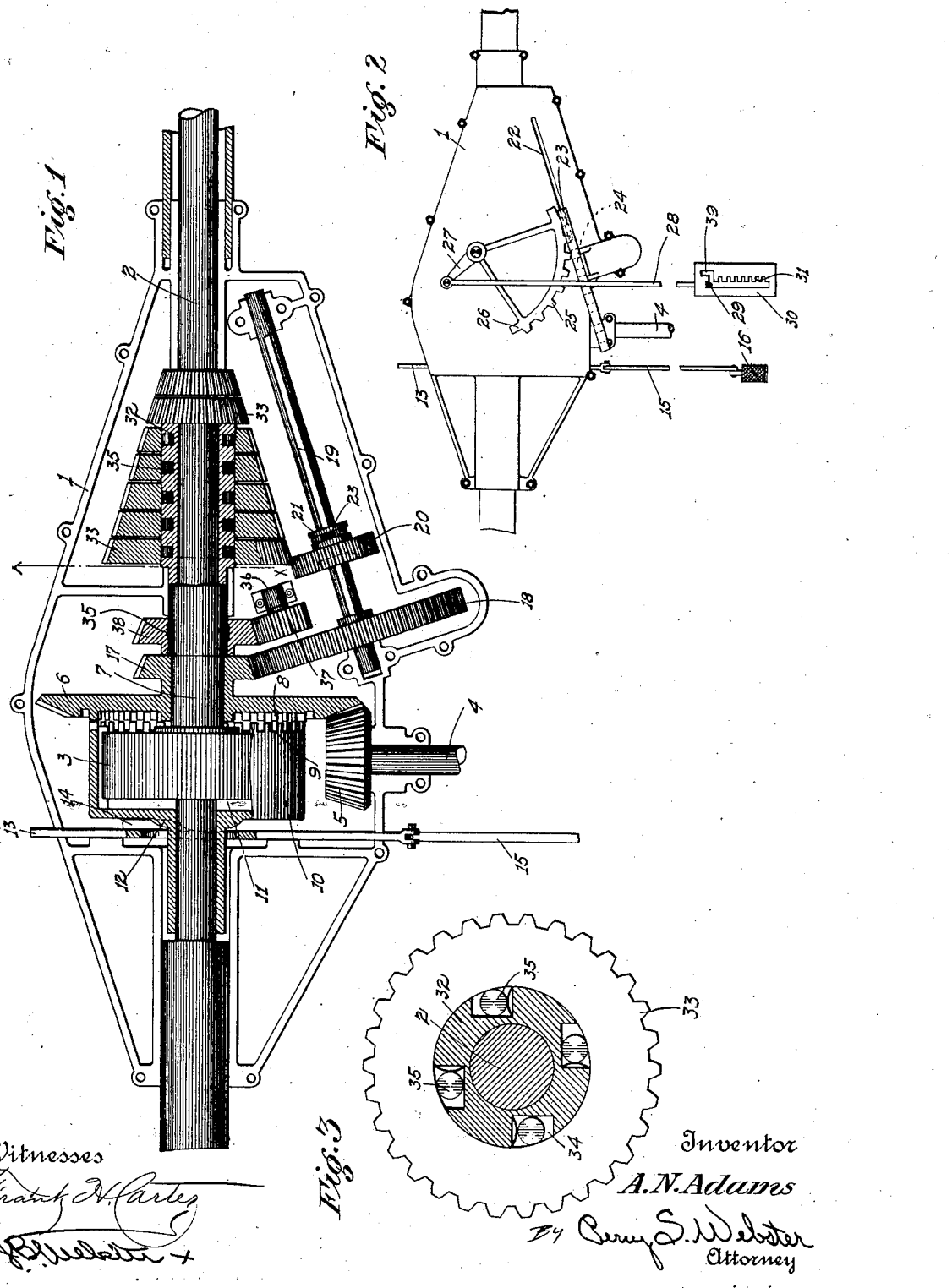

UNITED STATES PATENT OFFICE.

ALFRED N. ADAMS, OF STOCKTON, CALIFORNIA.

TRANSMISSION-GEARING.

1,111,551.  Specification of Letters Patent.  Patented Sept. 22, 1914.

Application filed December 26, 1911. Serial No. 667,572.

*To all whom it may concern:*

Be it known that I, ALFRED N. ADAMS, a citizen of the United States, residing at Stockton, in the county of San Joaquin, State of California, have invented certain new and useful Improvements in Transmission-Gearing; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in gearing for motor driven vehicles or the like, the object of the invention being to produce a transmission gearing disposed on the rear axle of the vehicle and a housing within the differential gear case. This transmission gearing will have a novel direct driving gearing combined with the differential gearing and in combination with this gear mechanism for giving variable speeds, such variable speed gear mechanism having as its main element a plurality of independent gears arranged in a cone shape and a sliding change gear movable over said cone gears to change the speed as will appear, said cone gears have an internal clutch mechanism which will permit of a sliding gear moving over the same while they are in motion without causing interference. I also provide a reversing gear mechanism disposed in coöperative relation with the other gearing and constructed in a manner as will appear.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a top plan view partly in section of the complete device. Fig. 2 is a top plan view of the gear casing. Fig. 3 is a sectional view taken on a line X—X of Fig. 1.

Referring now more particularly to the characters of reference on the drawings, 1 designates the gear case having suitable bearings for the various shafts and sleeves hereinafter described, such bearings having merely mechanical expedience, hence no detailed description of the same will be given at this time.

The numeral 2 designates the main axle of the vehicle provided with the usual differential gearing 3 which being commonly in use will not be described in detail in this specification. In applying my improved invention, 4 designates the main driving shaft from the engine of the vehicle and 5 the gear on the end thereof, which gear intermeshes with the larger gear 6 loosely mounted on the sleeve 7 on one of the parts of the differential gears. For the direct driving mechanism this gear 6 has its face provided with teeth 8 adapted to engage teeth 9 on the edge of a drum 10 keyed to one of the members 11 on the differential gearing. This drum 10 has a curving lug 12 on its rear face while 13 is a shift lever having a lug 14 adapted to engage the lug 12 to drive the teeth 9 into engagement with the teeth 8 when it is desired to have a direct drive, said member 13 having an operating lever 15 provided with a foot member 16 disposed at any desired point on the vehicle.

My variable speed gearing is constructed as follows; to-wit; secured as a component part of the gear 6 is another gear 17 driving a gear 18, said last named gear being keyed to an independent shaft 19, there being also slidably mounted on said shaft 19 a gear 20 having a collar 21 over which fits a yoke projecting through a slot 22 in the case 1 and being mounted on a bar 23 having a plurality of rack teeth 24 adapted to receive teeth 25 on a quadrant 26, said quadrant being provided with an operating lever 27 having a link 28 provided with a lever 29 adapted to move through a slotted guide 30 having a plurality of teeth 31 corresponding in number to the number of different positions to be assumed by the gear 20.

I further form as the component part of the sleeve 7 what I term an outer shaft 32 turnably mounted on which are a plurality of gears 33, said gears all being beveled and presenting in their entirety a substantially cone shaped member. Within the outer shaft 32 and in alinement with each of the gears 33 are a plurality of recesses 34, said recesses having their inner sides projecting substantially at right angles to each other, which thus make one end of said recesses wider than the other owing to the circular shape of the outer shaft 32. Within these recesses are rollers 35 and owing to the recesses 34 being smaller at one end than at the other when the gears 33 turn in one direction these rollers wedge between said gears 33 and said outer shaft 32, thus turning said outer shaft and, vice versa, in going the other way the rollers would move into the larger portion of the recesses 34 and the gears 33 would move freely around the outer shaft 32 without moving it. Similarly if one of the gears should move faster than the other, then the said faster moving gear would turn the outer shaft by reason of the frictional contact of the rollers 35 while the other gears would remain comparatively idle.

To cause the variable speed of the vehicle, the gear 20, by the shifting means as described, would be moved along to engage first one of the gears 33 and then the other. To increase the speed this operation would be commenced at the upper end of the cone and extended toward the lower end of the cone and to decrease the speed this operation would be reversed. By reason of the frictional roller contact described, as the gear 20 leaves one gear and moves into mesh with the adjacent gear of a lesser diameter, it will drive the gear into which it moves at a faster rate than the gear which it is leaving. This will have the effect of rotating the gear into which it is moving away from the frictional contact with the rollers 35 and this feature will permit of the intermeshing of the gear 20 without any danger of wrenching or stripping the gear which would be the case if the gear was made solid on the shaft 37. Since the sleeve 7 and outer shaft 32 are rigidly attached to the differential gear case 3 and the internal mechanism within said differential gear case is in turn attached to the shaft 2 this motion of the gears drives said shaft 2 fast or slow according to the position of the gear 20 on the plurality of the cone gears 33. To get the reverse motion I provide an idle gear 37 mounted on the shaft 36 and engaging another gear 38 on the sleeve 7. Said gear 38 is adapted to engage an internal roller clutch disposed in the opposite direction from those of the cone gears 33 and when the reverse motion is desired the lever 29 is shifted into a recess 39 in the member 30, which throws the quadrant 26 farther around and forces the gear 20 to engage the gear 37 and thus driving the gear 38, and hence the sleeve 7 causes the desired reverse motion.

As will appear, a reverse application of the cone of gears and the gear that slides over it remains entirely within the scope of ed to drive the sliding gear or the sliding gear may be adapted to drive the cone gears as may be found most adaptable.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device of the character described comprising a driven member, a beveled gear turnably mounted on said driven member, another beveled gear secured to said first named beveled gear, an independent shaft, a gear keyed to said independent shaft and engaging said last named beveled gear, a plurality of beveled gears mounted on said driven member, a sliding gear on said independent shaft adapted to engage said plurality of beveled gears, a beveled gear keyed to said driven member, an independent gear mounted independently of all of said gears and engaging said last named beveled member, said sliding gear being adapted to engage said independently mounted gear, as described.

2. A device of the character described comprising a driven member, a beveled gear turnably mounted on said driven member, another beveled gear secured to said first named beveled gear, an independent shaft, a gear keyed to said shaft and engaging said last named beveled gear, a plurality of beveled gears mounted on said driven member, a sliding gear on said shaft adapted to engage said plurality of beveled gears and means for driving said first named beveled gear, as described.

3. A device of the character described comprising a driven member, a beveled gear turnably mounted on said driven member, a beveled gear keyed on said driven member, an independently mounted gear engaging said last named beveled gear, an independent shaft, a gear mounted on said shaft and engaging said first named beveled gear, and a sliding gear mounted on said shaft and being adapted to engage said independently mounted gear, as described.

In testimony whereof I hereunto affix my signature in presence of two witnesses.

ALFRED N. ADAMS.

Witnesses:
 JOSHUA B. WEBSTER,
 FRANK H. CARTER.